G. A. HALL.
Draft Attachment for Vehicles.

No. 213,190. Patented Mar. 11, 1879.

WITNESSES
Villette Anderson
F. J. Masi

INVENTOR
Geo. A. Hall,
By E. W. Anderson
ATTORNEY

N. PETERS, PHOTO-LITHOGRAPHER, WASHINGTON, D. C.

UNITED STATES PATENT OFFICE.

GEORGE A. HALL, OF SOUTH WATERFORD, MAINE.

IMPROVEMENT IN DRAFT ATTACHMENTS FOR VEHICLES.

Specification forming part of Letters Patent No. 213,190, dated March 11, 1879; application filed September 23, 1878.

*To all whom it may concern:*

Be it known that I, GEORGE A. HALL, of South Waterford, in the county of Oxford and State of Maine, have invented a new and valuable Improvement in Draft Attachments for Vehicles; and I do hereby declare that the following is a full, clear, and exact description of the construction and operation of the same, reference being had to the annexed drawings, making a part of this specification, and to the letters and figures of reference marked thereon.

Figure 1:
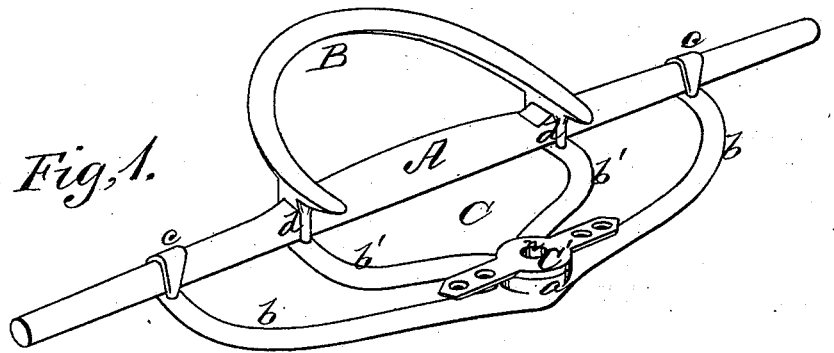
Figure 2:
Figure 3:
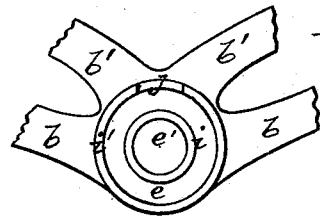
Figure 4:
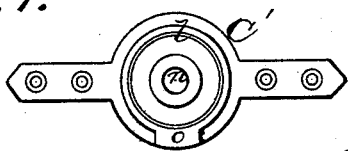

Figure 1 of the drawings is a representation of a perspective view of my improved draft attachment. Fig. 2 is a cross-sectional view of the same, and Figs. 3 and 4 are details.

This invention has relation to improvements in draft attachments for vehicles.

The object of my invention is to devise means whereby the power of the horse will be exercised in a straight or rising line from the front axle instead of in a downward direction, as is the case when the whiffletree is attached to the cross-bar of the thills, thus doing away with the continual pressure which the horse has to bear upon his back from the saddle, and preventing abrasion and blistering of the parts upon which the saddle rests.

The nature of the invention consists in the combination, with a fore axle-tree of a vehicle, of a horizontal circular bearing connected to the under side of said axle in front thereof by means of diverging projecting arms, and affording bearings to a whiffletree-plate or whiffletree, as will be hereinafter more fully set forth.

In the annexed drawings, the letter A designates the front axle of a vehicle, having secured to its upper side the lower part, B, of a fifth-wheel. C represents my improved draft attachment, composed of a hub, $a$, from which diverge rearwardly in curved symmetrical lines the arms $b\ b'$. These arms are usually four in number, and are provided at their free ends with the holes $v\ v'$, sufficiently spaced to receive the axle A between them.

The axle is secured to the draft attachment by means of clips $c$ and the clasps $d$ of the fifth-wheel circle B, clips being used in connection with the outer arms, and clasps with the inner ones.

The lower bearing-plate, $a$, is provided with an annular recess, $e$, around its central opening, $e'$, formed by two raised flanges, $i\ i'$, and the outer flange, $i$, has a notch, $j$, cut into it between the arms $b'$.

This circular bearing supports an independent whiffletree-plate, C', having a central opening, $n$, and an annular flange, $l$, adapted to be received between the flanges $i\ i'$ of the hub. It has also a lug, $o$, engaging the notch $j$, and of less size than the notch, so that when the lower and upper plates are coupled together by a suitable bolt, and the whiffletree is secured to the upper plate, the said tree will have proper play. The thills are coupled to the axle in the usual manner, but have no part in the draft, being limited in their functions to facilitating turning corners, backing, and holding back.

It will be observed that the draft is exercised from the axle direct in an upward direction, except when the front wheels are very high, when it will be sometimes exerted in a horizontal line from the shoulders of the horse. In either case there will be no downward pressure of the saddle upon the animal's back, thus doing away with galls, blisters, and other like injuries to the parts whereon the saddle rests. In vehicles having the whiffletree attached to the cross-bar of the thills, sometimes a foot or more above the axle, this pressure is excessive, and is more distressing than the actual labor of the draft.

Having thus described my invention, I claim as new, and desire to secure by Letters Patent, the following:

1. The combination, with the axle of a vehicle, of a draft attachment composed of a horizontal circular bearing, $a$, and arms $b\ b'$, extending therefrom and secured to the axle underneath the same, a whiffletree-plate, C', engaging with said bearings $a$, the pivot-bolt $n$, and a whiffletree-bar secured to the whiffletree-plate, and oscillating horizontally on said bearing $a$, substantially as specified.

2. The horizontal bearing-plate $a$, attached to the under side of the axle by the rearwardly-projecting arms $b\ b'$, and affording bearings to a whiffletree-plate, $C'$, which is connected thereto by a pivot-bolt, $n$, substantially as specified.

In testimony that I claim the above I have hereunto subscribed my name in the presence of two witnesses.

GEORGE A. HALL.

Witnesses:
FRANK A. NOBLE,
JONES R. HALL.